United States Patent [19]

Sperduti

[11] Patent Number: 5,634,733
[45] Date of Patent: Jun. 3, 1997

[54] COUPLER THAT DECOUPLES AT A MANUALLY ADJUSTABLE MOMENT WITHOUT DAMAGE

[76] Inventor: Mark Sperduti, 8252 Stanley Rd., Flushing, Mich. 48433

[21] Appl. No.: 617,076

[22] Filed: Mar. 18, 1996

[51] Int. Cl.$^6$ .................................................. F16B 2/02
[52] U.S. Cl. .................................. 403/2; 403/4; 403/313; 256/13.1; 52/165; 404/10
[58] Field of Search .............................. 403/2, 3, 4, 313, 403/DIG. 1; 256/13.1; 52/98, 165, 298, 99, 100; 404/6, 9, 10

[56] References Cited

U.S. PATENT DOCUMENTS

| | | | |
|---|---|---|---|
| 2,029,789 | 2/1936 | Parks . | |
| 3,385,565 | 5/1968 | Cuthbert | 256/13.1 X |
| 3,421,473 | 1/1969 | Weichenrieder | 404/6 X |
| 3,851,430 | 12/1974 | Schuster | 52/98 X |
| 3,967,906 | 7/1976 | Strizki | 52/98 X |
| 4,240,766 | 12/1980 | Smith et al. | 404/10 |
| 4,378,175 | 3/1983 | Hasselqvist | 404/10 |
| 4,565,466 | 1/1986 | Daggs et al. | 404/10 |
| 4,611,949 | 9/1986 | Schmanski | 404/9 |
| 4,619,456 | 10/1986 | Meggs | 403/DIG. 1 X |
| 4,799,816 | 1/1989 | Lechon et al. | 403/2 |
| 4,806,046 | 2/1989 | Clark | 404/10 |
| 5,004,366 | 4/1991 | Simmons | 403/2 |
| 5,039,100 | 8/1991 | Cortese | 273/127 |
| 5,088,683 | 2/1992 | Briden | 52/98 X |
| 5,197,819 | 3/1993 | Hughes | 404/13 |
| 5,404,682 | 4/1995 | West | 52/165 |
| 5,503,496 | 4/1996 | Voigt | 404/10 |

FOREIGN PATENT DOCUMENTS

| 646657 | 4/1964 | Belgium | 404/10 |
|---|---|---|---|
| 919378 | 1/1973 | Canada | 404/10 |

*Primary Examiner*—Kenneth J. Dorner
*Assistant Examiner*—Bruce A. Lev
*Attorney, Agent, or Firm*—James C. McLaughlin

[57] ABSTRACT

The coupler has, in several embodiments, a compliant-link having flexible or pivoted fingers that engage a groove in the inside of a lower link in at least three places. The groove appears much like a bearing race. The compliant-link is retained inside of an upper sleeve that is attached to an upward-extending post. The lower (engaging) link is attached to a downward-extending post. The fingers are able to disengage from the groove under spring action and thus a sufficient applied moment will cause disengagement. Disengagement does not cause anything to break. Assembly, or reassembly, of the coupler may be performed without extra parts or tools. In several of the embodiments, the decoupling moment may be manually adjusted using less moment than the resultant decoupling moment. The decoupling moment is essentially independent of azimuth. The coupler is particularly suited to being used with rural type mailboxes, and warehouse buffers and supports. It can add safety to sports by disconnecting basketball hoops and hockey nets before injury can occur, and add safety to shovels or drawbars by disconnecting excessive loads.

20 Claims, 8 Drawing Sheets

COUPLER THAT DECOUPLES AT A MANUALLY ADJUSTABLE MOMENT WITHOUT DAMAGE

TECHNICAL FIELD OF THE INVENTION

The technical field of the present invention is that of mechanical couplings that will decouple when more than a particular moment is applied without breaking anything. Further, the technical field of the present invention encompasses such couplings where the decoupling moment may be adjusted and where, after a decoupling, the coupling may be recoupled with little effort using only the original coupler and no tools.

"Moment" as used herein is the commonly understood product of force times distance and may be expressed in newton-meters or an equivalent unit. Thus a coupler that decouples only when a force of 100 newtons (or more) is applied normal to, and 0.1 meter from, the coupler is said to decouple at 10 newton-meters and to have a decoupling moment of 10 newton-meters. "Rotational moment" is used herein as moment applied rotationally.

The technical field of the present invention also includes mechanical couplings that will decouple without breaking anything when more than a particular force is applied axially to the coupling. In other words, the technical field of the present invention comprises couplings that are decoupled with a bending action or a pulling action.

BACKGROUND INFORMATION

The initial impetus for the present invention, and a major object of the present invention, is a coupler between a ground or floor mounted anchoring stub-post and a vertically-extending post that supports a mail-box or other object. The present invention strives to abate the perennial problem of rural type mail-boxes (or buffers and supports used in warehouses or the like) being knocked down by an errant vehicle and then requiring a major effort to be resurrected. Additionally, the present invention can add safety to sports by disconnecting basketball hoops and hockey nets before injury can occur, and add safety to shovels or drawbars by disconnecting excessive loads.

Many mechanical couplers exist that decouple at a particular applied moment with the breaking of something. The term "break-away" is frequently applied to such couplers. Some of these couplers may be recoupled when the part broken during decoupling is replaced. A representative U.S. Patent showing this type of device is U.S. Pat. No. 4,021,977 to Deike. The Deike patent places a plastic pipe inside of, and bridging, two coaxial posts such that the plastic pipe will break when the assembly is struck. Extra length of plastic pipe is provided so that a fractured portion may be discarded, a weakening hole pierced in the remainder, and the remainder used as the next weak link. It is a major object of the present invention to provide a coupling that does not break anything incident to decoupling and that is readably recoupled after a decoupling.

In some applications of decoupling couplers the direction of the relevant force may be predicted. A sign post placed next to the edge of a road is most likely to be struck by a blow that is roughly parallel to the road. Couplers having a decoupling moment that is a significant function of the azimuth of the applied force are known. A representative U.S. Patent describing this type of device is U.S. Pat No. 4,171,919 to Willis. The device disclosed in Willis involves interposing a "retaining member" having a long axis between the ends of two coupled posts. The relevant ends of the posts are formed into identical, elaborate tongue-and-groove fittings having a void that runs normal to the major axis of the posts. The retaining member is placed within the void with its long axis normal to the major axis of the posts. The moment required to decouple this device must vary significantly with the azimuth of the applied force. It is also disclosed that the retaining member is expected to be replaced after it is destroyed. Many applications exist (such as buffers or supports in a warehouse or the like) where the decoupling force might arrive from most any azimuth. Therefore, an additional object of the present invention is to provide a coupling with a decoupling moment that is substantially independent of the azimuth of the applied force.

It is a major object of the present invention to provide a coupling that has a decoupling moment that is adjustable. It is preferable that the decoupling moment be adjustable manually by a human without the use of tools. Secondarily, it is desirable that the decoupling moment be adjustable at the time of manufacture.

It is a major object of the present invention to provide a coupling that is easy for a human to couple, or to recouple if decoupling has taken place, without the use of tools and only using the original parts of the coupler. In this context, "easy" means an effort that is both not significant for an average adult human and an effort that is much less than the effort needed to decouple the coupler. Effort includes moment.

It is a major object of the present invention to provide a coupling that requires less moment to adjust the decoupling moment than the resultant decoupling moment when the decoupling moment is manually adjusted.

SUMMARY OF THE INVENTION

The foregoing and other objects and advantages are achieved with the apparatus disclosed below. The apparatus has, in several embodiments, a compliant-link having flexible fingers that are capable of engaging (and when coupled, do engage) a groove in the inside of the top of the lower link (engaging-link) in at least three places. The groove appears much like a bearing race. The compliant-link is retained inside of an upper (retaining) sleeve that is, in turn, attached to an upward-extending post. The use of a sleeve facilitates the use of the present invention, but is optional as the compliant-link could be directly attached to an upward-extending post. The lower (engaging) link is placed within (or otherwise attached to) a downward-extending post. The flexible fingers are able to move away from engaging the groove under spring action and thus a sufficient applied moment will cause disengagement. The spring action arises naturally from the flexibility of the fingers and may be supplemented by additional spring means for urging the fingers outward. Disengagement does not cause anything to break.

In the first embodiment, the compliant-link is formed from a cylindrical piece of springy material (such as steel or plastic) having a rounded protrusion (which is formed into fingers) all the way around the outside of one end. The end with the rounded protrusion has a coaxial and concave amount of material removed forming a cavity, and has four diagonal cuts that form eight fingers. The shape of the concave cavity (which is under the control of the manufacturer) materially determines the effective stiffness of the fingers, and thus the decoupling moment, by changing the thickness of the fingers.

In the first embodiment, the lower part of the engaging-link is narrow enough to fit snugly within the downward-extending post, and the top of the engaging-link has a wider portion forming a rim to go over the downward-extending post and to contain within it the aforementioned groove. The engaging-link is sliced diagonally, forming two identical halves. By partitioning the engaging-link into two (or more) mating pieces, assembly is facilitated.

The first embodiment of the device is assembled (or reassembled) by separating the two halves of the lower link slightly, placing the compliant-link's fingers within the groove (made easy by the separation of the two halves), squeezing the two halves together and inserting them in the downward-extending post. The aforementioned rim on the engaging-link prevents entry of all of the engaging-link into the downward-extending post. The upper (retaining) sleeve is placed over and used to secure the compliant-link, and is attached to the upward-extending post.

An alternate (second) embodiment uses a more complex, eight-fingered compliant-link that includes means to adjust the decoupling moment in the field. A third, even more complex, preferred embodiment uses a compliant-link having three pivoted fingers and includes an adjustable spring means for urging the fingers outward (thus providing field adjustable means for varying the decoupling moment).

DETAILED DESCRIPTION OF THE INVENTION AND ITS PREFERRED EMBODIMENT

Figure 1:
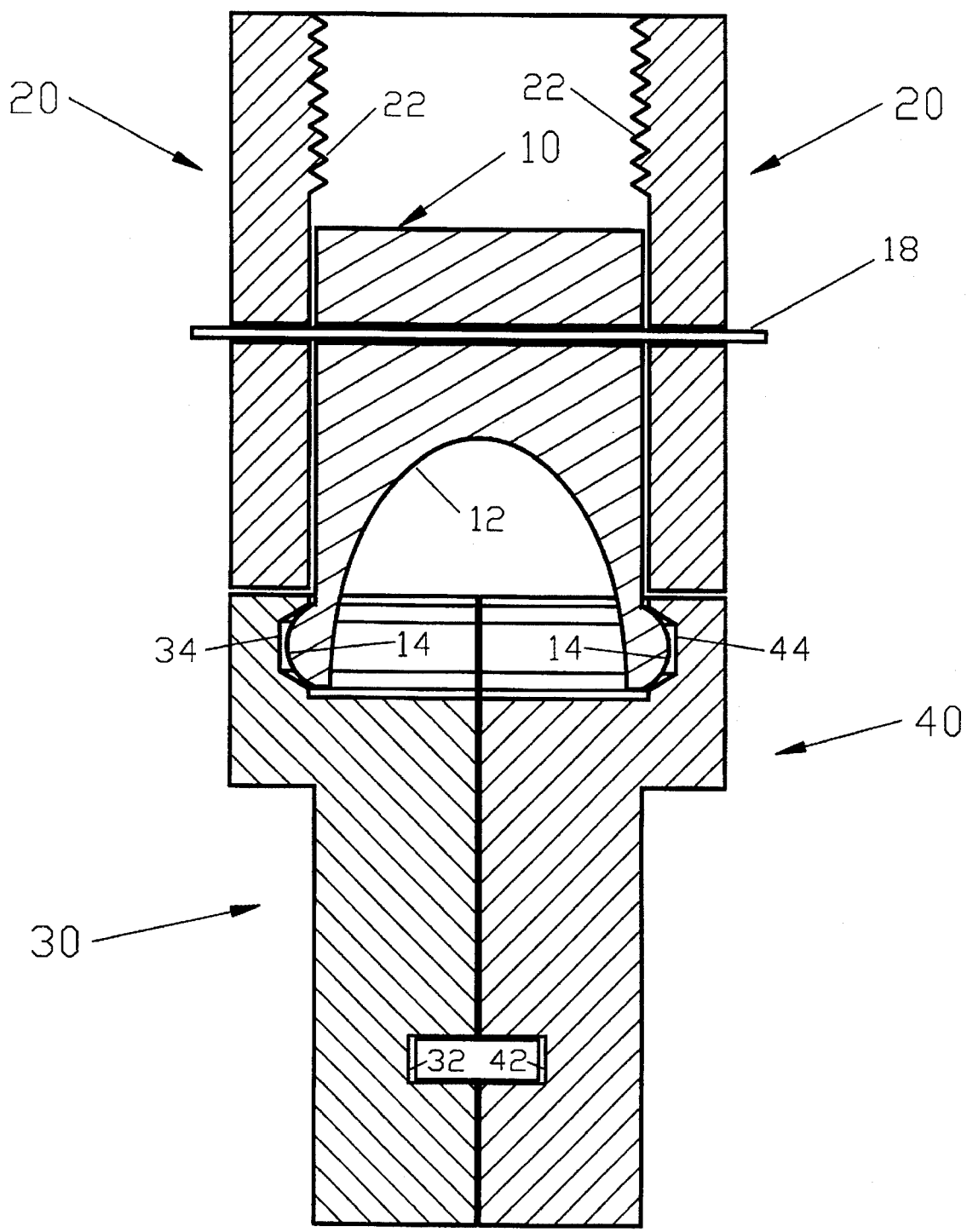
FIG. 1 is a side view of the assembled first embodiment of the present invention that has been sliced in half.

Three embodiments and a variation of the present invention are described. With three embodiments, the names of the elements are sometimes similar. An element is part of the link, sleeve, or other major assembly that is indicated by the reference numeral associated with the name of that element. The reference numerals of each major assembly end in zero. Thus link-pin-hole 17 is part of first-compliant-link 10 and first-link-pin-hole 55A is part of second-compliant-link 50.

The present invention comprises up to three cooperating assemblies: a lower link (the engaging-link) that is attached to a downward-extending post; a compliant-link having flexible fingers that engage a groove in the inside of the lower link; and an upper (retaining) sleeve that is attached to an upward-extending post and that retains the compliant-link.

The First Embodiment

Figure 4:
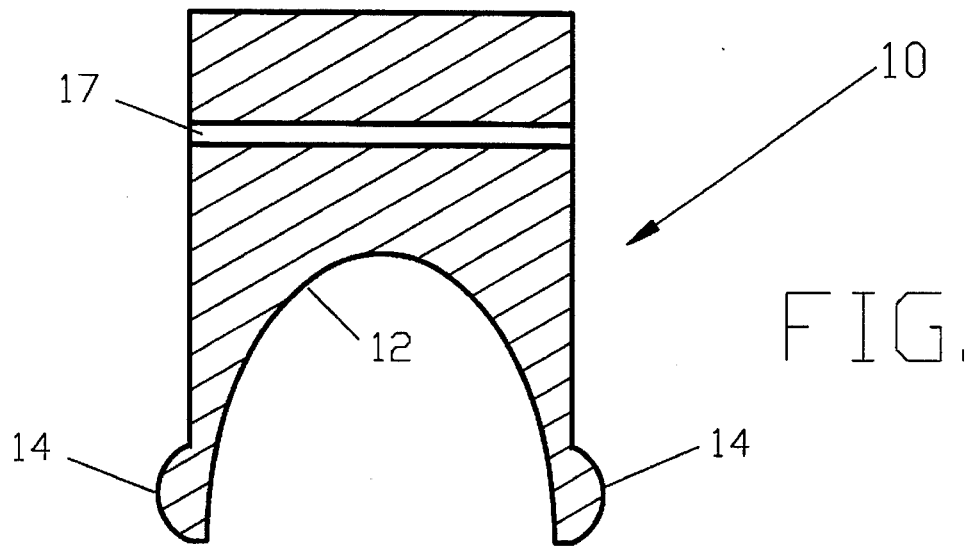
FIG. 4 is a side view of the first embodiment of the compliant-link sliced in half.
Figure 5:
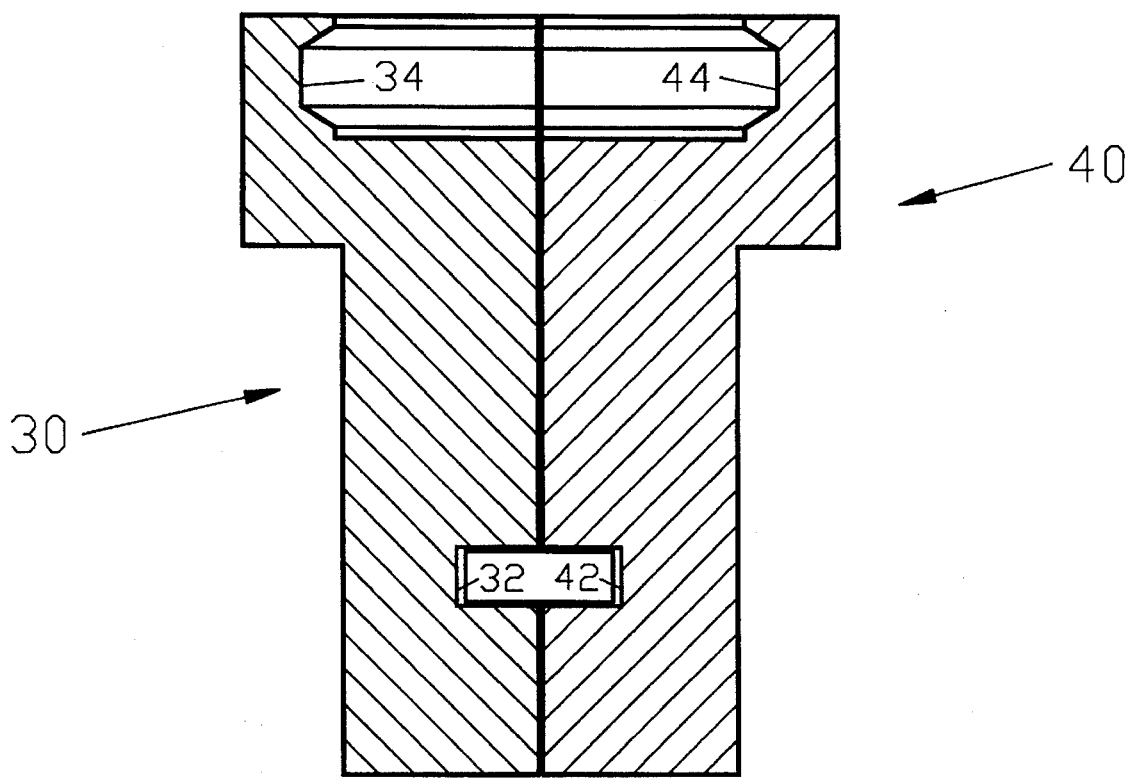
FIG. 5 is a side view of the two halves of the engaging-link.

The first embodiment of the present invention is shown assembled on FIG. 1, and its major parts are shown separately on FIGS. 2, 3, 4, and 5. FIG. 5 shows the lower link as used in the first embodiment and in the second embodiment. It consists of two identical halves: first-engaging-link 30 and second-engaging-link 40. The first-engaging-groove 34 of first-engaging-link 30 mates with second-engaging-groove 44 of second-engaging-link 40 to form a circular groove similar in appearance to that of a bearing race. When first-engaging-link 30 and second-engaging-link 40 are placed next to each other (as shown on FIG. 5 and as they are placed when in use) a cylindrical shape results with a wide portion at the top forming a rim to go over the downward-extending post and to contain the aforementioned circuitous groove. It is preferable that the shapes of first-engaging-link 30 and second-engaging-link 40 be slightly more narrow at the bottom (i.e. tapered) to facilitate being placed inside of a downward-extending post having a mating internal shape. The present invention encompasses lower links with other than a cylindrical shape that would fit within downward-extending posts having mating internal shapes. First-alignment-key 32 and second-alignment-key 42 are recesses for receiving any bridging object that could be used during assembly (discussed below) to keep first-engaging-link 30 and second-engaging-link 40 from vertical displacement. The present invention encompasses any means (or no means) to assist in keeping the halves of the lower link from displacing while they are inserted in a downward-extending post.

Figure 3:
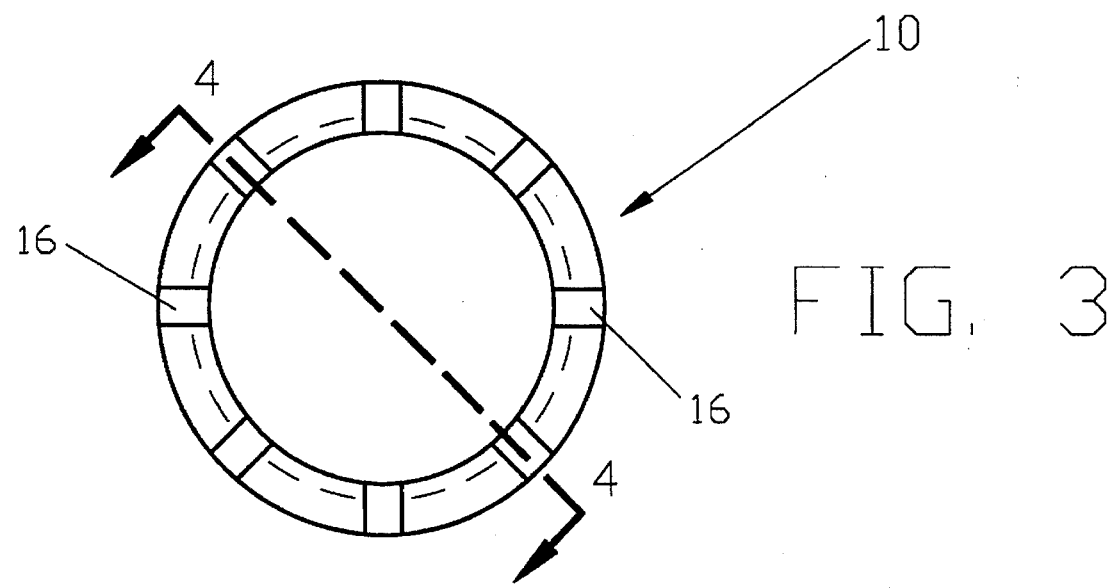
FIG. 3 is a bottom view of the first embodiment of the compliant-link.

FIGS. 3 and 4 show the first-compliant-link 10. It is formed from a cylindrical piece of springy material having a rounded protrusion all the way around the outside of one end that forms engaging-fingers 14. The end with the rounded protrusion has a coaxial and concave amount of material removed forming concave-cavity 12, and has four diagonal cuts (cuts 16) forming eight engaging-fingers 14. The shape of concave-cavity 12 (which is under the control of the manufacturer) materially determines the effective stiffness of the fingers and thus the decoupling moment. First-compliant-link 10 is not readably modifiable in the field. However, it is a particularly inexpensive compliant-link to use with the many applications that do not require field modification. Link-pin-hole 17 is a hole through first-compliant-link 10 and is used to attach first-compliant-link 10 to retaining-sleeve 20, as is discussed below.

Figure 2:
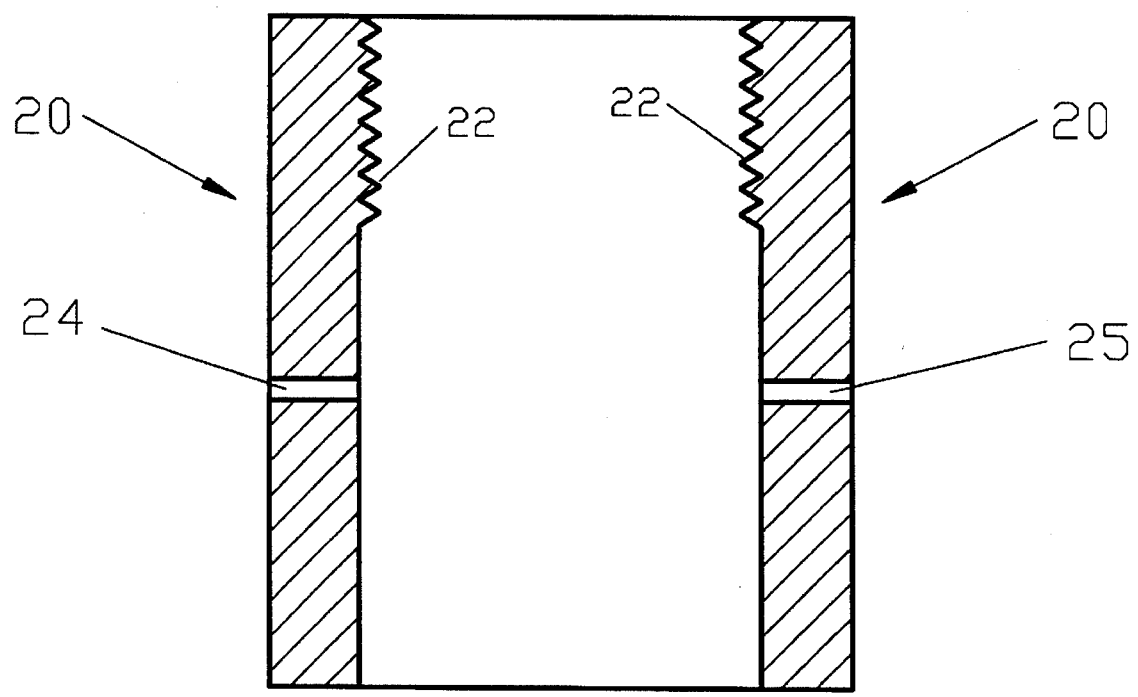
FIG. 2 a side view of the retaining-sleeve that has been sliced in half.

FIG. 2 shows the retaining-sleeve 20 used by the first embodiment and the second embodiment. It is a hollow cylinder with internal threads 22 at its upper end and is pierced with first-pin-hole 24 and second-pin-hole 25. Threads 22 are used to attach by screwing retaining-sleeve 20 to an upward-extending post that has mating threads. First-pin-hole 24 and second-pin-hole 25 are used to attach first-compliant-link 10 to retaining-sleeve 20.

FIG. 1 shows the whole assembly of the first embodiment. Assembly (or reassembly after a decoupling) is preferably performed as follows (it is apparent that the order of some of the steps may be changed): (1) retaining-pin 18 is driven through first-pin-hole 24, link-pin-hole 17, and second-pin-hole 25 to attach first-complaint-link 10 and retaining-sleeve 20 together (this step needs to be performed once and may be performed by the manufacturer); (2) first-engaging-link 30 and second-engaging-link 40 are slightly separated, first-engaging-groove 34 and second-engaging-groove 44 are placed around engaging-fingers 14, first-engaging-link 30 and second-engaging-link 40 are placed tightly together and pushed down into the open end of a mating downward-extending post (optionally, an object may be inserted into the cavity formed from first-alignment-key 32 and second-alignment-key 42 to inhibit vertical displacement); and (3) a mating upward-extending post is attached to retaining-sleeve 20 by screwing it into threads 22.

When the retaining-sleeve of the present invention, or the upward-extending post that it holds, is subjected to a normal component of force a moment is produced that tends to tilt the retaining-sleeve. Such a tilt tends to cause fingers located toward the side where the force is applied to rise within the groove and be compressed. If the moment is below a threshold then, when the moment is removed, the device will recenter itself. If the moment is above the threshold, the compressed fingers will over-ride and escape from the groove, and decoupling without damage will result. Thus detachment may be effected by the application of sufficient non-compressive force between the engaging-link and the sleeve. If the applied force is essentially compressive, it is apparent that normal detachment is not expected. The decoupling action just described is essentially the same for each embodiment.

The Second Embodiment

The second embodiment of the present invention differs from the first embodiment of the present invention in the use of second-compliant-link 50 in lieu of first-compliant-link 10. The second embodiment shares retaining-sleeve 20, first-engaging-link 30, and second-engaging-link 40 with the first embodiment. The second embodiment is shown assembled on FIG. 8, and the details of second-compliant-link 50 are shown on FIGS. 6 and 7.

Figure 7:
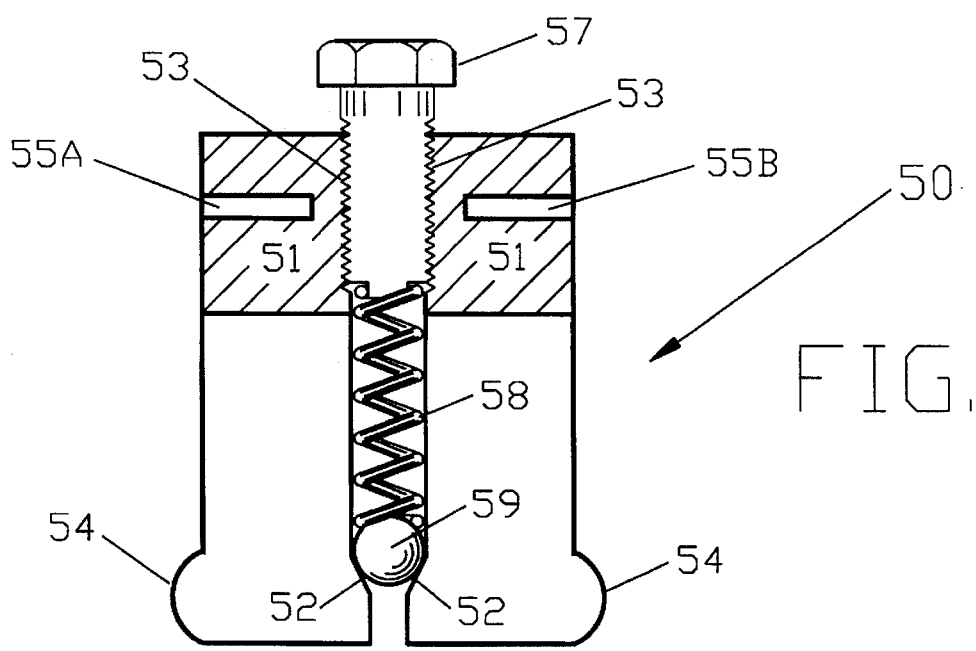
FIG. 7 is a side view of the second embodiment of the compliant-link that has been sliced in half and shows the adjusting parts.
Figure 6:
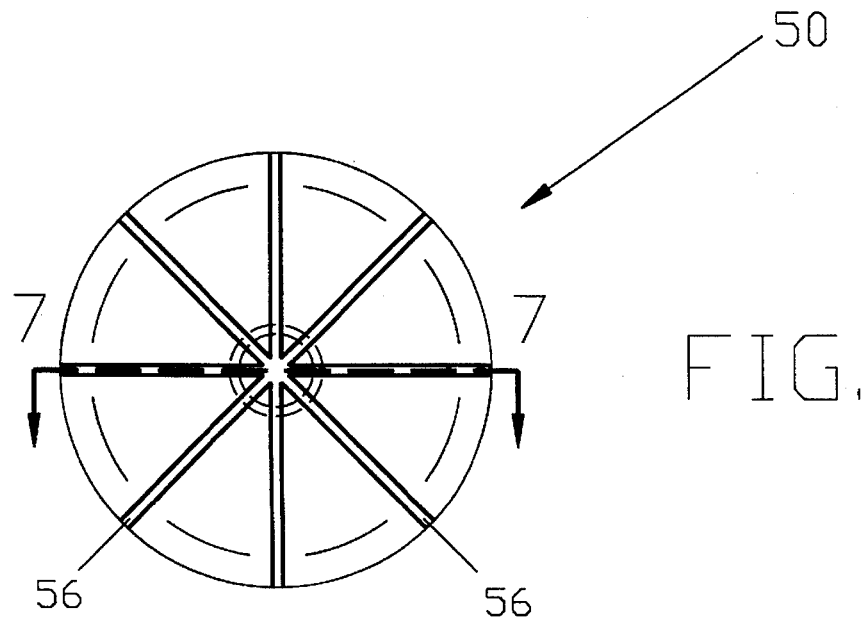
FIG. 6 is a bottom view of the second embodiment of the compliant-link.
Figure 8:
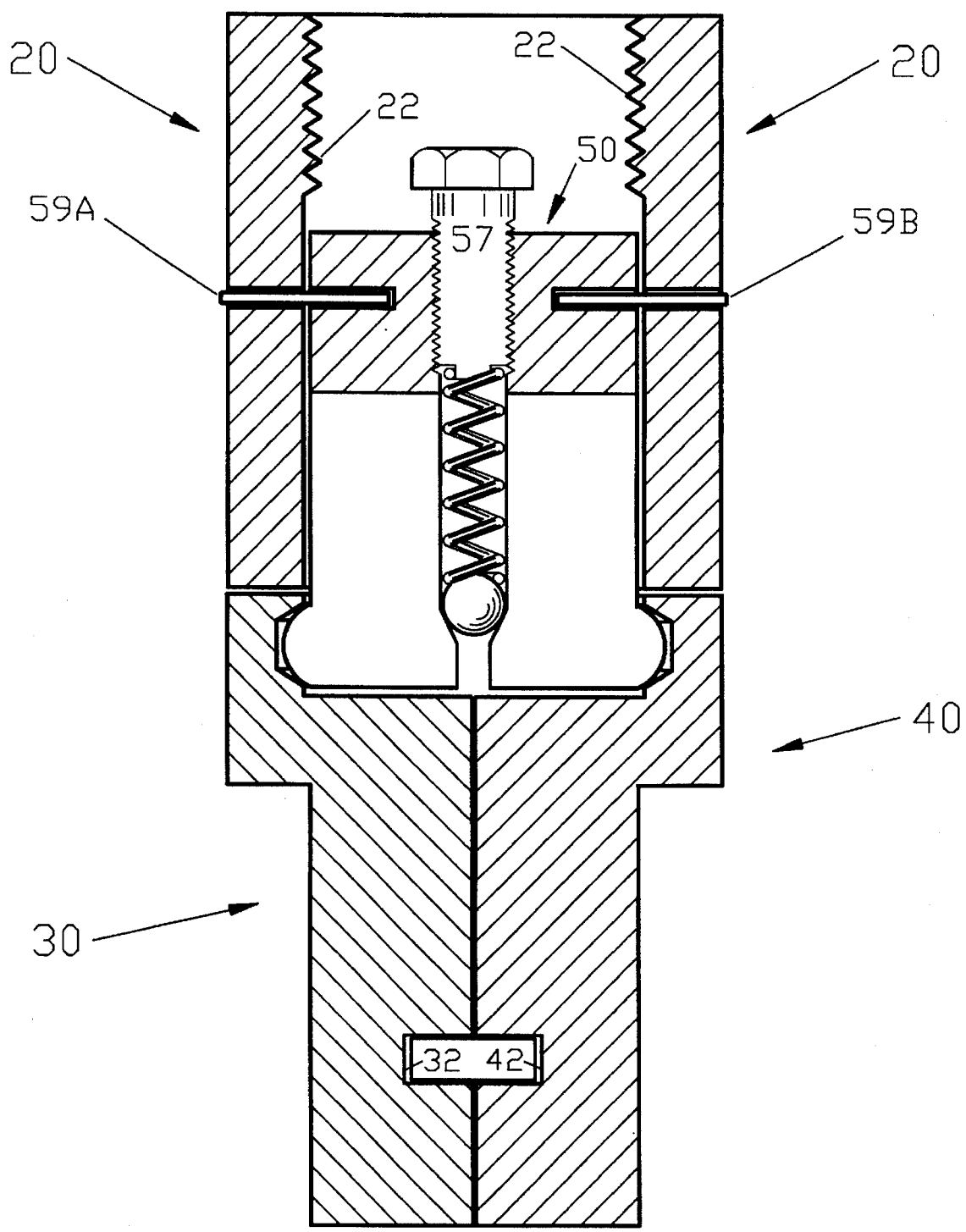
FIG. 8 is a side view of the assembled second embodiment of the present invention that has been sliced in half.

Second-compliant-link 50, shown on FIGS. 6 and 7, is more complex than first-compliant-link 10 (used in the first embodiment). The complexity is due to means for field adjustment of the decoupling moment of the whole assembly. Second-compliant-link 50 is formed from a cylindrical piece of springy material having a rounded protrusion all the way around the outside of one end that forms engaging-fingers 54. The end with the rounded protrusion has four diagonal cuts (cuts 56) forming eight engaging-fingers 54 and a coaxial hole that is narrow at the bottom to form wedge-contour 52 and threaded at the top to form threads 53. At the bottom of the coaxial hole is placed sphere 59 with a diameter such that it touches wedge-contour 52. Spring 58 is placed above sphere 59 and adjustment-bolt 57 is screwed into threads 53 so as partially to compress spring 58. In turn, the force produced by a partially compressed spring 58 causes sphere 59 to tend to displace wedge-contour 52 (and thus engaging-fingers 54) outward. In effect, adjustment-bolt 57 (which might be adjustable without tools), spring 58, sphere 59, and wedge-contour 52 produce an adjustable outward force on engaging-fingers 54 that must be overcome (in addition to that caused by the springiness of engaging-fingers 54 alone) before decoupling takes place. In operation, if a user wishes a larger decoupling moment he or she would tighten adjustment-bolt 57 and a smaller decoupling moment would result from loosening adjustment-bolt 57. Thus the second embodiment provides adjustable spring means for urging the fingers outward.

The upper portion of second-compliant-link 50 that is not partitioned by cuts 56 (uncut-portion 51) is pierced with first-link-pin-hole 55A and second-link-pinhole 55B. As is seen on FIG. 8, second-compliant-link 50 is attached to retaining-sleeve 20 by the use of first-retaining-pin 59A within first-pin-hole 24 and first-link-pin-hole 55A, and second-retaining-pin 59B within second-pin-hole 25 and second-link-pin-hole 55B. The assembly, reassembly, and use of the second embodiment is otherwise the same as for the first embodiment except that one may adjust the decoupling moment by varying the tension of adjustment-bolt 57.

The Third Embodiment

The third embodiment of the present invention differs from the first embodiment and the second embodiment in using a relative complex set of means to implement the functions of the other embodiments. The third embodiment is shown assembled on FIG. 9. Third-retaining-sleeve 80 contains third-compliant-link 60 that includes three engaging-fingers 64 preferably distributed every 120 degrees around a central shaft 65. Engaging-fingers 64 may pivot about pivot 64A to disengage engaging-nut 64B from engaging-groove 94. In order to pivot so as to disengage, engaging-fingers 64 must slightly lift force-transmitting-disk 63 against the compressive force of spring 62. The compression of spring 62 is set by how far down shaft 65 force-adjusting-disk 61 has been screwed. Thus a means exists to adjust the decoupling moment (further explained below). Pivot 64A may be formed from a pin extending through engaging-fingers 64 into barrel-pivot-flange 66. Barrel-pivot-flange 66 is cylindrical with protruding flanges, is confined axially between lock-washer 66A and lock-washer 66B, and may rotate within third-retaining-sleeve 80. Thus, barrel-pivot-flange 66 is rotatably captive within third-retaining-sleeve 80. Alternate means for providing a pivot for engaging-fingers 64 will be apparent to one skilled in the art. Engaging-nut 64B may be formed from a round-head bolt. Force-transmitting-disk 63 preferably has a concave surface impinging against engaging-fingers 64. Force-adjusting-disk 61 is able to travel vertically in disk-guide 84, which may be made from a single conventional key. Thus, force-adjusting-disk 61 is a threaded disk able to move only vertically within third-retaining-sleeve 80. Threads 82 are for attaching third-retaining-sleeve 80 to an upward-extending post.

While the third embodiment of the present invention shows three pivoting engaging-fingers 64 urged outward by an adjustable spring means having its spring 62 mounted axially, the present invention encompasses more than three pivoting fingers and adjustable spring means that have one or more springs (or spring equivalents) extending other than axially.

The method of engaging (or re-engaging) the third embodiment of the present invention is different than the method used by the other two embodiments. Engaging and adjusting the decoupling moment are performed together. Since third-engaging-link 90 and its engaging-groove 94 is in one piece (whereas its equivalent in the other two embodiments is in two pieces) it is apparent that third-complaint-link 60 must be loosened prior to insertion into third-engaging-link 90. This is accomplished by screwing third-retaining-sleeve 80 relative to third-complaint-link 60 so as to decompress spring 62. This may be done by hand with cross-pin 67 preventing the escape of force-adjusting-disk 61 as it moves upward. Third-compliant-link 60 and third-retaining-sleeve 80 are then placed on third-engaging-link 90 so that the three engaging-nuts 64B are within engaging-groove 94. Tension in spring 62 is increased to produce the desired disengagement moment by rotating third-retaining-sleeve 80 relative to third-compliant-link 60. This motion is facilitated by placing a simple obstruction 93 within third-engaging-link 90 so that after no more than a third of a turn (when three engaging-fingers 64 are used) engaging-fingers 64 (pined to barrel-pivot-flange 66) are prevented from rotating within third-engaging-link 90 (while force-adjusting-disk 61, which rotates with third-retaining-sleeve 80, moves vertically to change the compression of spring 62). The obstruction 93 may be a pin or a bump in engaging-groove 94. Thus, for the third embodiment, engaging-groove 94 is preferred to be continuous (in the other two embodiments, the groove is discontinuous because the engaging-link there used is partitioned) and to contain at least one obstruction 93 that prevents complete rotation of engaging-fingers 64 within engaging-groove 94. The use of three, equally spaced engaging-fingers 64 insures that the decoupling moment is independent of azimuth.

The shape of engaging-groove 94 (a circuitous groove inside the rimmed top of third-engaging-link 90), the mating surface of engaging-nut 64B (a protrusion capable of engaging and rotating within engaging-groove 94 until stopped from further rotation by contact with the obstruction 93), the placement of pivot 64A, the stiffness of spring 62, and the pitch of the threads used on shaft 65 to screw it through force-adjusting-disk 61 (particularly the latter) cause less rotational moment to be used to adjust the decoupling moment than the resultant decoupling moment. In particular, an average adult human can adjust the decoupling moment by hand to such a high value that the same person will have difficulty decoupling the coupler using only their hands placed on either side of the coupler. After decoupling, the same effort is required to readjust the decoupling moment and it can be accomplished without the use of tools or objects other than the original parts.

The shape of engaging-groove 94 is preferably concave in cross-section and each engaging-nut 64B has a convex surface that so mates with engaging-groove 94 that no significant damage results upon decoupling. The present invention comprehends other mating surfaces that will also allow decoupling without significant damage.

Spring 62 placed between force-adjusting-disk 61 and force-transmitting-disk 63, and around shaft 65, effects a rotationally adjustable spring means engaging the upper portion of engaging-fingers 64 for applying an adjustable force to urge the lower portion of engaging-fingers 64 outward and is such that, after one engages the engaging-nuts 64B (protrusions capable of engaging and rotating within engaging-groove 94) within engaging-groove 94, rotation of third-retaining-sleeve 80 beyond that needed to stop rotation of engaging-fingers 64 will adjust the force urging engaging-fingers 64 outward. Thus it is inherent that by engaging engaging-nuts 64B within engaging-groove 94 and applying a rotational moment to third-retaining-sleeve 80 that is more than needed to stop rotation of engaging-fingers 64, one will adjust the decoupling moment. It will be apparent to one skilled in the art that alternative spring means could be effected and an alternate is discussed below. It is desirable to provide sufficient adjustment range in the spring means that engaging-nuts 64B (protrusions) of engaging-fingers 64 can be engaged within engaging-groove 94, prior to adjusting the decoupling moment, using a negligible amount of force.

Figure 9:
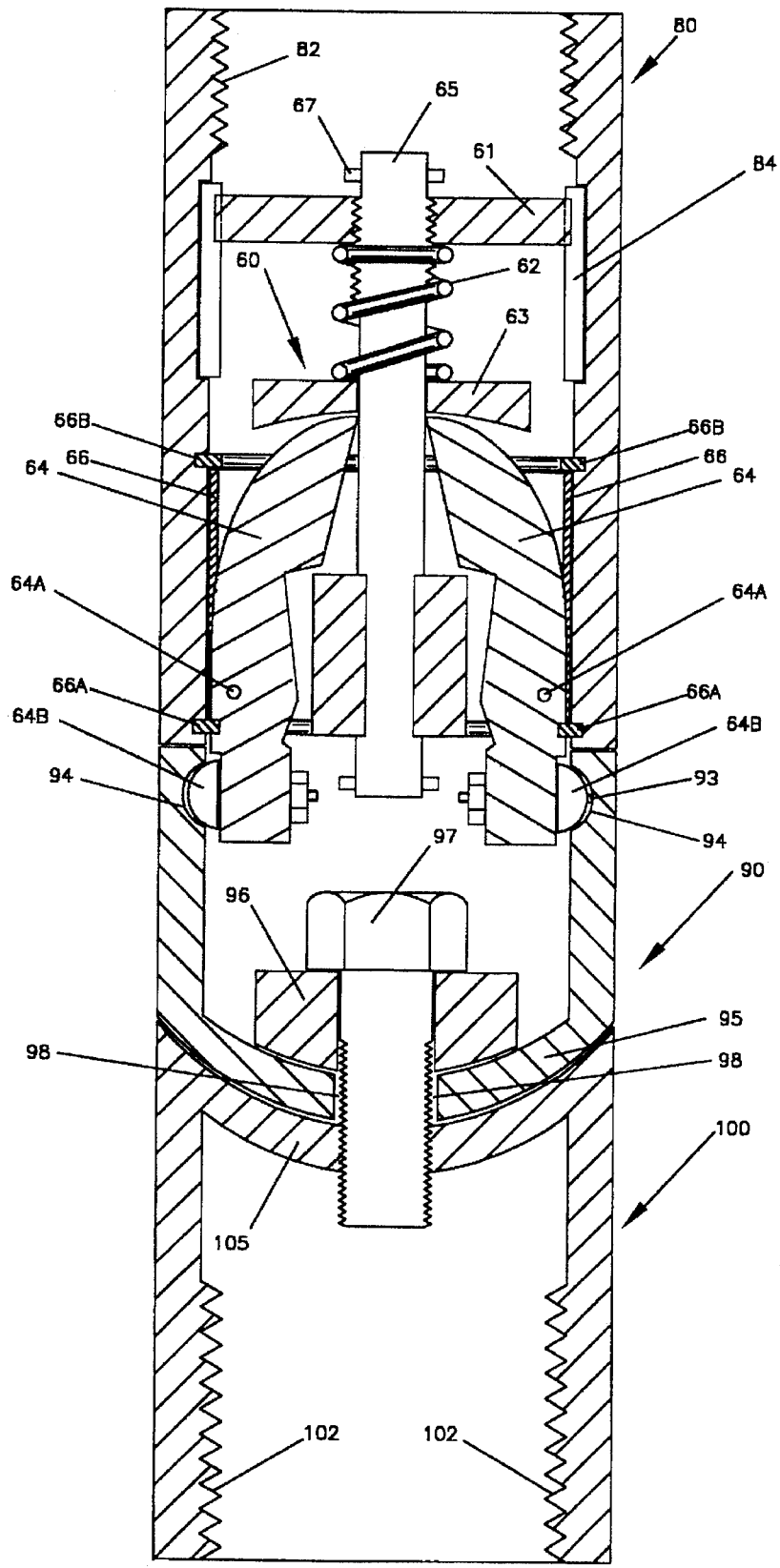
FIG. 9 is a side view of the assembled third embodiment of the present invention that has been sliced open.
Figure 10:
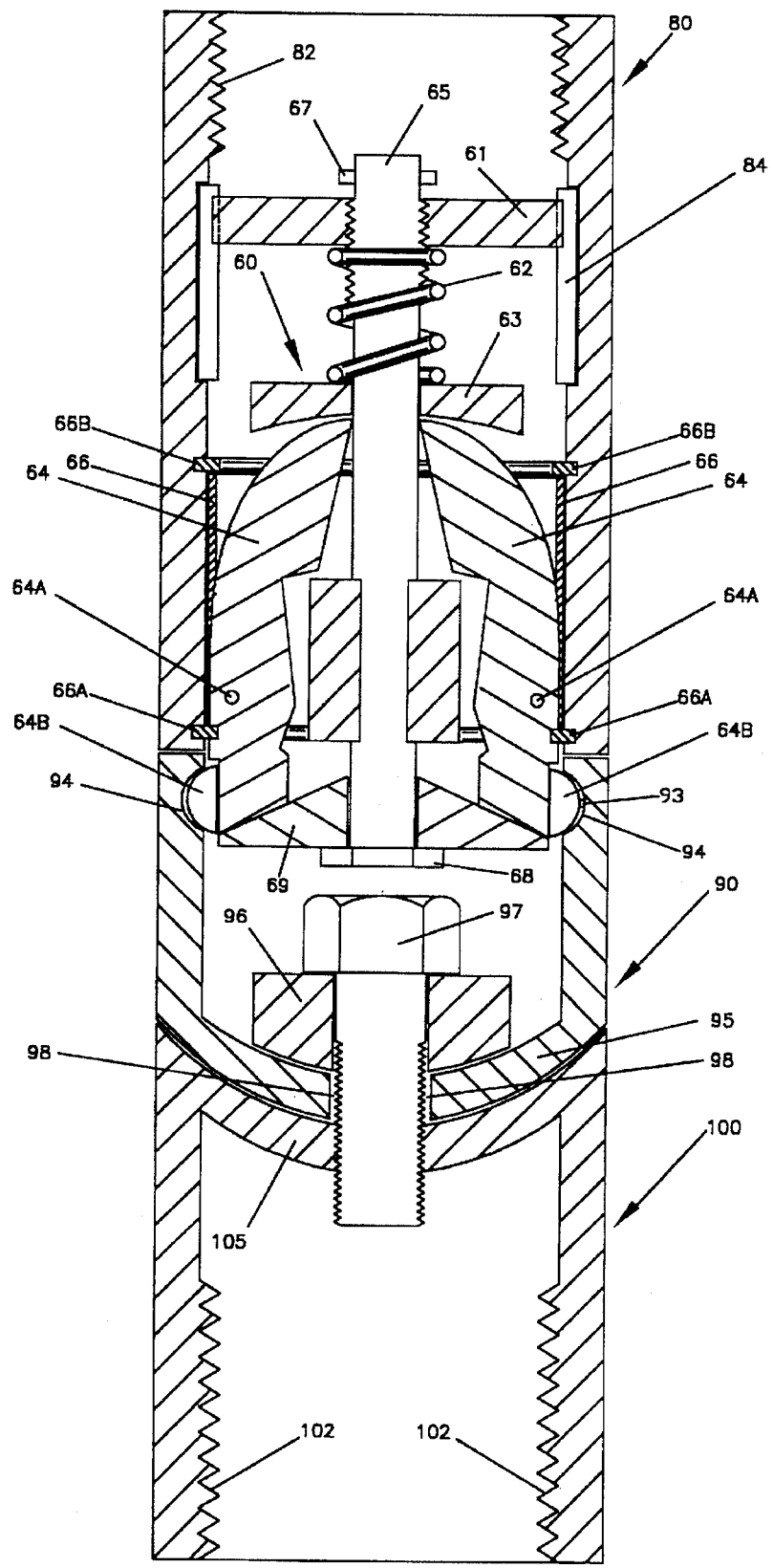
FIG. 10 is a side view of a variation of the third embodiment of the present invention that has been sliced open.

Third-engaging-link 90 could be attached to a downward-extending post. An option, shown used with the third-embodiment on FIG. 9 and FIG. 10, is a means for somewhat adjusting the cant. In the option, third-lower-link 100 is attached to a downward-extending post using threads 102 to mate with same. Third-lower-link 100 is attached to third-engaging-link 90 across a curved interface (preferably spherical) formed from curved-surface 95 and curved-surface 105 so that the two elements may be canted rather than being coaxial. Attachment is effected by placing locking-bolt 97, buffered by curved-washer 96, through gap 98 in curved-surface 95 and threading locking-bolt 97 into curved-surface 105. Prior to the final tightening of locking-bolt 97, cant is effected by tilting third-engaging-link 90 in the desired direction within the limits of gap 98 that is provided in curved-surface 95. Because of the size and conformity of curved-washer 96, gap 98 may be fairly extensive and still allow secure attachment of third-engaging-link 90 to third-lower-link 100 with a significant cant.

A variation of the third embodiment is shown on FIG. 10. This variation consists of: using bolts for engaging-nut 64B that are screwed into engaging-fingers 64; forming the lower portions (ends) of engaging-fingers 64 into inclined planes; and extending shaft 65 downward to end in shaft head 68 that loosely retains wedge washer 69 against the inclined plane parts of the lower portions of engaging-fingers 64. This effects a variation on the aforementioned rotationally adjustable spring means for applying an adjustable force to urge the lower portion of engaging-fingers 64 outward. The essence of the variation is the application of an adjustable force both to the upper portion of engaging-fingers 64 and to the lower portion of engaging-fingers 64 so as to urge the lower portion of engaging-fingers 64 outward.

The coupler of the present invention is intended to be placed between two conventional members. Herein, those members have been called a downward-extending post and an upward-extending post. Herein, attachment of the coupler to those members has been effected by screwing them into mating threads or placing part of the engaging-link within the downward-extending post. The present invention encompasses any means of attachment to any types of outwardly-extending members and comprehends those outwardly-extending members extending in other than a vertical direction. The present invention also encompasses the non-use of the sleeve and the attachment of the compliant-link directly to (or being part of) the upward-extending post.

In view of accomplishing the goal of a coupler that can have its decoupling moment adjusted manually and after an essentially effortless engagement, and the goal of using less moment to adjust the decoupling moment than the resultant decoupling moment, the preferred embodiment is the third embodiment shown on FIG. 9.

A preferred embodiment, and alternate embodiments, of the present invention have been described in detail. The embodiments described are illustrative and not restrictive.

I claim:

1. A detachable coupler, of adjustable decoupling moment, for coupling a downward-extending post and an upward-extending post comprising:

an engaging-link having
    a bottom end provided with means for attachment to the downward-extending post, and
    a top end provided with a rim, said top end, said top end having a circuitous groove inside said rim that contains at least one obstruction; and a sleeve capable of rotating and having
    a top end provided with means for attachment to the upward-extending post,
    at least three pivoted fingers each having a pivot, a lower portion extending below said pivot, and an upper portion extending above said pivot, said lower portion containing a protrusion capable of engaging and rotating within said groove of said top end of said engaging-link until stopped from further rotation by contact with said obstruction, said pivots being attached to a flange that is rotatably captive within said sleeve, and
    a rotationally adjustable spring means urging said upper portion of said pivoted fingers for applying an adjustable force to urge said lower portion of said fingers outward and such that, after engaging said protrusions within said groove, rotation of said sleeve beyond that needed to stop rotation of said fingers will adjust the force urging said fingers outward, whereby engaging said protrusions within said groove and applying a rotational moment to said sleeve that is more than needed to stop rotation of said fingers will adjust the decoupling moment.

2. The coupler of claim 1, wherein said bottom end of said engaging-link further includes means for adjusting cant between the engaging link and the downward-extending post.

3. The coupler of claim 1, wherein the amount of decoupling moment can be adjusted after said protrusions are engaged within said groove.

4. The coupler of claim 1, wherein said rotationally adjustable spring means further includes sufficient adjustment range that said protrusions of said fingers can be engaged within said groove, prior to adjusting the decoupling moment, using a negligible amount of force.

5. The coupler of claim 1, wherein said rotationally adjustable spring means and said pivoted fingers are such that said rotational moment used to adjust the decoupling moment is less than the resultant decoupling moment.

6. The coupler of claim 1, wherein said circuitous groove is concave in cross-section and said protrusions have a convex surface that so mates with said groove that no significant damage results upon decoupling.

7. The coupler of claim 1, wherein said pivoted fingers are essentially equally spaced from each other.

8. A detachable coupler, of adjustable decoupling moment, for coupling a downward-extending post and an upward-extending post comprising:

an engaging-link having
a bottom end provided with means for attachment to the downward extending post, and
a top end provided with a rim, said top end having a circuitous groove inside said rim that contains at least one obstruction; and
a sleeve capable or rotating and having
a top end provided with means for attachment to the upward-extending post,
at least three pivoted, fingers each having a pivot, a lower portion extending below said pivot and an upper portion extending above said pivot, said lower portion containing a protrusion capable of engaging and rotating within said groove of said top end of said engaging-link until stopped from further rotation by contact with said obstruction, said pivots being attached to a flange that is rotatably captive within said sleeve, and
a rotationally adjustable spring means urging said upper portion of said pivoted fingers, and urging said lower portion of said pivoted fingers, for applying an adjustable force to urge said lower portion of said fingers outward and such that, after engaging said protrusions within said groove, rotation of said sleeve beyond that needed to stop rotation of said fingers will adjust the force urging said fingers outward, whereby engaging said protrusions within said groove and applying a rotational moment to said sleeve that is more than needed to stop rotation of said fingers will adjust the decoupling moment.

9. The coupler of claim 8, wherein said rotationally adjustable spring means' engagement of said lower portion of said pivoted fingers consists of a wedge means for applying a force to urge said lower portion of said fingers outward.

10. The coupler of claim 8, wherein the amount of decoupling moment can be adjusted after said protrusions are engaged within said groove.

11. The coupler of claim 8, wherein said rotationally adjustable spring means further includes sufficient adjustment range that said protrusions of said fingers can be engaged within said groove, prior to adjusting the decoupling moment, using a negligible amount of force.

12. The coupler of claim 8, wherein said rotationally adjustable spring means and said pivoted fingers are such that said rotational moment used to adjust the decoupling moment is less than the resultant decoupling moment.

13. The coupler of claim 8, wherein said circuitous groove is concave in cross-section and said protrusions have a convex surface that so mates with said groove that no significant damage results upon decoupling.

14. The coupler of claim 8, wherein said pivoted fingers are essentially equally spaced from each other.

15. The coupler of claim 14, wherein said pivoted fingers are three in number.

16. A detachable coupler, of adjustable decoupling moment, for coupling a downward-extending post and an upward-extending post comprising:

an engaging-link having
a bottom end provided with means for attachment to the downward-extending post, and
a top end provided with a rim, said top end having a circuitous groove inside said rim that contains at least one obstruction; and
a sleeve capable of rotating and having
a top end provided with means for attachment to the upward-extending post and a bottom end,
at least three pivoted fingers each having a pivot, a lower portion extending below said pivot, and an upper portion extending above said pivot, said lower portion extending below said bottom end of said sleeve and containing a protrusion capable of engaging and rotating within said groove of said top end of said engaging-link until stopped from further rotation by contact with said obstruction, said pivots being attached to a flange that is rotatably captive within said sleeve, and
a rotationally adjustable spring means urging said upper portion of said pivoted fingers for applying an adjustable force to urge said lower portion of said fingers outward and such that, after engaging said protrusions within said groove, rotation of said sleeve beyond that needed to stop rotation of said fingers will adjust the force urging said fingers outward,
said spring means includes a spring compressed between a threaded disk able to move only vertically within said sleeve and said upper portion of said pivoted fingers, and a vertical shaft having one end attached to said flange and the other end rotatably threaded into said disk, whereby engaging said protrusions within said groove and applying a rotational moment to said sleeve that is more than needed to stop rotation of said fingers will adjust the decoupling moment.

17. The coupler of claim 16, wherein the amount of decoupling moment can be adjusted after said protrusions are engaged within said groove.

18. The coupler of claim 16, wherein said rotationally adjustable spring means further includes sufficient adjustment range that said protrusions of said fingers can be engaged within said groove, prior to adjusting the decoupling moment, using a negligible amount of force.

19. The coupler of claim 16, wherein said rotationally adjustable spring means and said pivoted fingers are such that said rotational moment used to adjust the decoupling moment is less than the resultant decoupling moment.

20. The coupler of claim 16, wherein said circuitous groove is concave in cross-section and said protrusions have a convex surface that so mates with said groove that no significant damage results upon decoupling.

* * * * *